Dec. 25, 1956 R. PHILLIPS 2,775,321
BRAKE ADJUSTMENT MECHANISM
Filed July 1, 1953

INVENTOR.
ROY PHILLIPS
BY Hudson, Boughton,
Williams, David & Hoffmann
ATTORNEYS

United States Patent Office 2,775,321
Patented Dec. 25, 1956

2,775,321

BRAKE ADJUSTMENT MECHANISM

Roy Phillips, Chagrin Falls, Ohio

Application July 1, 1953, Serial No. 365,317

4 Claims. (Cl. 188—196)

The present invention relates to automotive brakes and, more particularly, to an attachment for automatically adjusting the nonbraking clearance between the linings on the brake shoes and the brake drums of friction brakes commonly used in automotive hydraulic braking systems.

The principal object of the present invention is the provision of a new and improved device which may be quickly and easily applied to a conventional brake for automotive vehicles to maintain a predetermined clearance between the linings on the brake shoes and the brake drum when the shoes are in their nonbraking position, which device is simple in construction and so arranged that all the parts thereof are free from forces which might interfere with their proper operation, thus producing a trouble-free, reliable device.

Another object of the present invention is the provision of a new and improved friction brake having brake shoes with linings thereon, means for operating the brake shoes, and adjusting means for adjusting the position of the brake shoes as the lining thereon wears, the operating parts of the adjusting means being so constructed and arranged that they are free from transverse thrust and all other forces except those imposed thereon by their respective functions as well as being relatively dust and dirt free.

The invention resides in certain novel constructions and combinations and arrangements of parts and further objects and advantages of the invention will be apparent to those skilled in the art to which the invention relates from the following description of the preferred embodiment thereof described with reference to the accompanying drawings forming a part of this specification, and in which.

Although the invention may be incorporated in or applied to various types of friction brakes, it is especially suitable for use with conventional automobile hydraulic friction brakes and is herein shown, for purposes of illustration, as embodied in a device readily attachable to a conventional automobile hydraulic brake.

Figure 1:
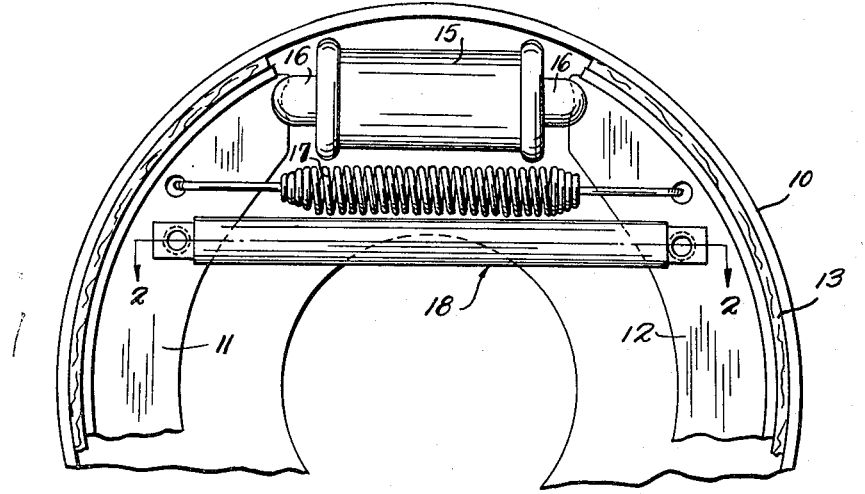
Fig. 1 is a fragmentary elevational view of a hydraulic friction brake embodying the present invention.

Referring to the drawings, the brake shown comprises a brake drum 10, brake shoes 11, 12 provided with brake linings 13. The brake shoes are pivotally mounted at a point, not shown, for movement to braking position by a hydraulic cylinder 15 located intermediate the upper, adjacent, spaced ends of the brake shoes. When pressure is applied to the cylinder, hydraulic plungers 16 engaging the upper ends of the shoes move outwardly to expand the shoes and press the lining 13 into engagement with the brake drum, as shown in Fig. 1. A retracting spring 17 connected to the brake shoes adjacent to the brake cylinder pulls the brake shoes back into their non-braking position when the pressure is removed from the hydraulic cylinder 15. The construction thus far described is conventional and per se forms no part of the present invention.

In order for the brake to function satisfactorily, it is desirable to have and maintain a predetermined clearance between the brake drum and the brake lining when the brake is in its non-braking position. The clearance, however, between the lining and the drum will become greater as the brake is used due to the wear of the lining. The present invention provides an adjusting mechanism or device 18 for automatically maintaining a predetermined clearance between the lining and the brake drum as wear occurs, which device is preferably constructed as a unit that may be quickly and easily attached to a conventional hydraulic friction brake and is so shown in the drawings.

The adjusting device 18 determines the point to which the spring 17 returns the brake shoes 11, 12 and, as shown, comprises a tube or sleeve 20 having slidably supported therein coaxial members 21, 22 positioned in end-to-end relationship with their outer ends connected to the shoes 12, 11, respectively. The minimum spacing between the members 21, 22 is controlled by a spacing or abutment member 23 threaded into member 21 and provided with a shoulder 24 on a part projecting therefrom adapted to abut the inner end of member 22. The spring 17, in absence of overriding pressure in cylinder 15, will move the upper ends of the brake shoes 11, 12 toward each other until the member 22 abuts the shoulder 24 on the member 23, thereby preventing further inward movement. The effective length of the members 21, 22 and the spacing member 23 determines the distance between the outer ends of the members 21, 22 when the brake is in its non-braking position, and consequently the brake clearance. The members 21, 22 fit closely within the tube 20 but are freely slidable therein and the ends thereof projecting beyond the opposite ends of the tube 20 are provided with mounting pins 25 adapted to be inserted into drilled apertures in the brake shoes and secured therein by snap rings 26.

Figure 2:
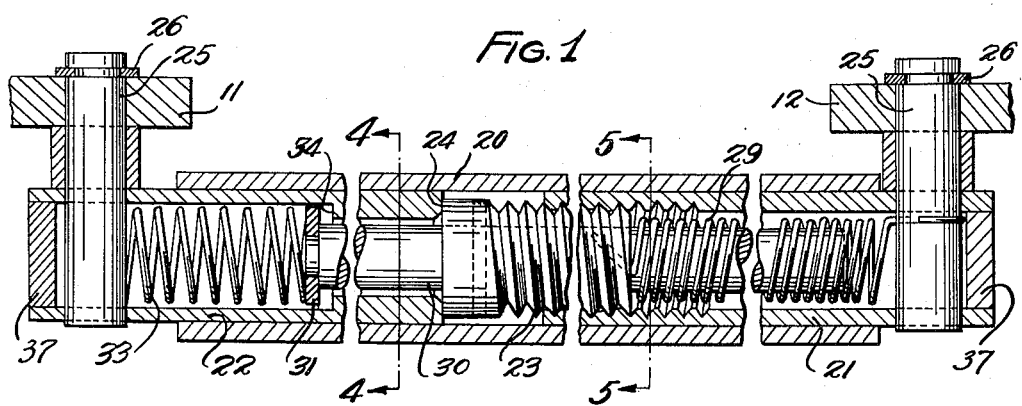
Fig. 2 is an enlarged sectional view approximately along line 2—2 of Fig. 1 and showing the brake adjusting mechanism in the nonbraking position.
Figure 3:
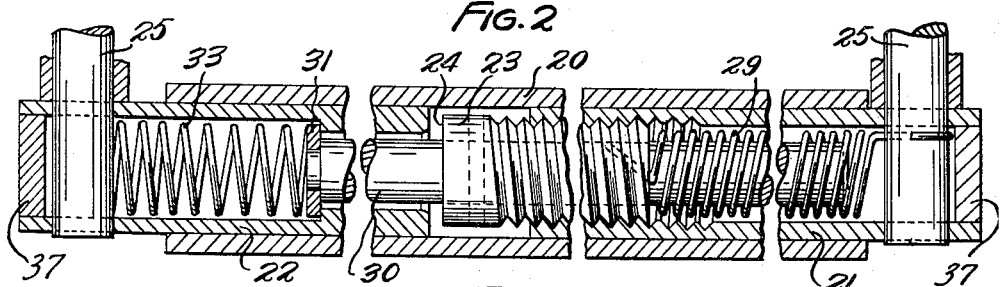
Fig. 3 is a view similar to Fig. 2 but showing the adjusting mechanism in the braking position.
Figures 4, 5:
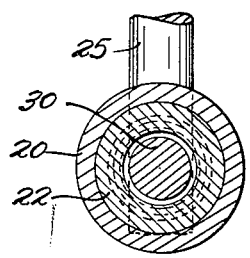
Fig. 4 is a sectional view taken approximately along line 4—4 of Fig. 2.
Fig. 5 is a sectional view taken approximately along line 5—5 of Fig. 2.

When pressure is applied to the cylinder 15 to move the brake shoes to their braking position, the member 22 and the shoulder 24 on the member 23 will be moved apart, see Fig. 3. The spacing between the member 22 and the shoulder 24 when the shoes are in their braking position will be a function of the clearance between the brake shoes or linings and the brake drum when the brake shoes are in the nonbraking position; that is, when the member 22 abuts the shoulder 24 on the member 23. As wear occurs, the clearance between the lining and the drum, and consequently the spacing between member 22 and the shoulder 24 on the member 23 when the brakes are applied, tends to increase; but, in the present invention, the spacing between member 22 and the shoulder 24 of the member 23 when in braking position and, in turn, the brake clearance are maintained constant by the turning or threading of the member 23 toward the member 22 to compensate for wear as it occurs. To this end, a torsion spring 29 within the member 21 is interposed between the member 23 and the right hand pin 25. The spring 29 tends to rotate the member 23 so that it will be threaded outwardly of member 21 toward member 22. The rotation, however, of member 23 is prevented when the brake clearance is as desired by the engagement of the end of a rod 30 pinned or otherwise fixed to the member 23 with a washer like member 31 located within and positioned transversely of the counterbored, left hand end of the member 22. The rod 30 may, as in the illustrated embodiment, extend through the member 23 into member 21 and function as a guide rod for spring 29. The member 31 is biased in a direction towards the end of rod 30 by a compression spring 33 within the member 22 intermediate the plate 31 and the left-hand pin 25. When the member 22 and the member 23 are moved apart, the rod 30 will be withdrawn, in part, from the member 22. The plate 31 will follow and maintain engagement with the rod 30 until it strikes the shoulder 34 at the bottom of the counterbore in the member 22 within which it is located. At this point, if the relative movement between member 23 and member 22 is continued, as is the case when wear occurs, the rod 30 will tend to lose contact with the plate 31 but will be prevented from so doing by the spring 29 which will thread the member 23 outwardly of member 21 to maintain engagement between the end of the rod 30 and the washer 31. A predetermined maximum distance is, therefore, always maintained between the end or shoulder 24 of the member 23 and the member 22, which distance is equal to the length of that portion of the rod 30 extending beyond the shoulder 34 when the member 22 and member 23 are in abutting or nonbraking relationship. By proportioning the parts so that the rod 30 extends a distance beyond the shoulder 34, which is proportioned to the desired brake clearance when the member 22 and member 23 are in their abutting or nonbraking position, as is shown in Fig. 2, the proper brake clearance will be maintained as wear occurs by the automatic threading of member 23 outwardly to increase the spacing between members 21, 22. It will be noted from the drawings that the tube 20 and the members 21, 22 are of maximum length consistent with the space limitations imposed by the size of the brake, thereby providing long, overlapping, sliding connections which permit free operation of the various parts and prevent any sagging and binding. The members 21, 22 float, so to speak, within the tube 20 and no binding forces or stresses are imposed upon the threaded connection between the member 21 and the member 23 other than those required to perform the desired operation. The projecting ends of members 21 and 22 are closed by plugs 37 to assure that the operating parts will remain free from dust and dirt. The close sliding fit between the tube 20 and the members 21, 22, also aids in preventing the entrance of dust and dirt into the operating mechanism.

If the adjusting mechanism, when installed, is adjusted so that the shoes have a greater clearance in their non-braking position than that desired, the member 23 will be threaded outwardly the first time the brakes are applied, to automatically adjust the effective length of members 21, 22 and member 23 and thereafter the lining on the shoes will have the proper clearance with respect to the brake drum when returned to their non-braking position.

The adjusting mechanism may be assembled and shipped with a wire tack line keeping the parts of the mechanism positioned so that the effective length of members 21, 22 and member 23, with the member 22 spaced a distance from the shoulder 34 equal to the desired brake clearance, is at the minimum for the particular mechanism. The tack line may pass through drilled apertures in the tube 20, member 22, and rod 30, the apertures being aligned when the parts are positioned as above. When the mechanism is to be installed, the brake shoes are moved to their braking position and the right hand pin 25 may be rotated threading the member 21 outwardly to increase the effective length of the members 21, 22 and member 23 so that the pins 25 will fit in the receiving apertures in the shoes 11, 12. The spacing between member 22 and shoulder 34 remains equal to the desired brake clearance during the installation because these members are held against relative movement by the tack line which may also mount a tag with installation instructions. The tack line may then be removed to allow the brake shoes to be returned to their non-braking position by spring 17. The desired clearance will then exist between the linings on the shoes and the brake drum, which clearance will then be maintained by the adjusting mechanism functioning in the manner set out in the specification.

While the members 21, 22 have been described as both being slidably mounted in the tube 20, the invention will function satisfactorily if one of the members 21, 22 is fixed with respect to or formed integral with tube 20 and the other slidable so long as a long, well overlapping, sliding connection is maintained so as to avoid any sagging, etc. of the parts which might tend to interfere with their free and easy operation.

Adjusting mechanism could also be interposed between a fixed part of the brake and one or both brake shoes, rather than between the shoes, in the event that it became desirable to adjust the position of a single shoe or to adjust the brake shoes individually.

It can now be seen that the present invention provides a brake adjusting mechanism whose operating parts are free of transverse thrust and all other forces except those imposed thereon by their respective functions and which may be easily and quickly installed on the conventional friction brake used in automotive vehicles. It is also apparent that the invention is susceptible to various modifications within the scope of the appended claims and is not limited to the particular construction described and it is the intention to hereby cover all adaptations, modifications and variations which come within the practice of those skilled in the art to which the invention appertains.

Having thus described my invention, I claim:

1. A brake adjusting mechanism comprising a tube, first and second members within said tube in end-to-end relationship, said members closely fitting said tube and at least one being adapted for axial movement with respect thereto, one of said members projecting from one end of said tube and the other of said members projecting from the other end of said tube, a threaded member threaded into said first member and having a portion engaging the second member, thereby spacing said first and second members, spring means for rotating said threaded member in a direction for moving it toward said second member to increase the spacing between the first and second members, means preventing the rotation of said threaded member when said second member is less than a predetermined distance away from engagement with said portion.

2. A brake adjusting mechanism comprising a tube, first and second members positioned in said tube in end-to-end relationship, said members closely fitting said tube and at least one being adapted for axial movement with respect thereto, one of said members projecting from one end of said tube and the other of said members projecting from the other end of said tube, a threaded member threaded into said first member and having a portion engaging the second member to thereby space said first and second members, spring means for rotating said threaded member in a direction for moving it toward said second member to increase the spacing between the first and second members, means preventing the rotation of said threaded member, and means for rendering the last-said means inoperative when said second member is more than a predetermined distance from engagement with said portion.

3. A brake adjusting mechanism comprising a tube, a first and second member positioned in said tube in end-to-end relationship, said members closely fitting said tube and adapted for axial movement with respect thereto, the first member projecting from one end of said tube and the second member projecting from the other end of said tube, a spacing member threaded into said first member and adapted to extend therefrom, cooperating abutment means on said second member and said spacing member for spacing said first and second members, a portion of said spacing member freely extending into said second member, spring means within said first member for rotating said spacing member in a direction so that it is moved by said threaded connection toward said second member, a spring biased member within said second member for engaging said portion of said spacing member and preventing the rotation of said spacing member by said spring means, and means for preventing engagement of said spring biased member with said portion of said spacing member when said abutment means are moved more than a predetermined distance from abutting engagement with each other.

4. A brake adjusting mechanism comprising a tube, a first and second member positioned in said tube in end-to-end relationship, said members closely fitting said tube and adapted for movement with respect thereto, one of said members projecting from one end of said tube, the outer ends of said members being adapted to be connected to a braking element, a spacing member threadably supported by said first member and a portion of which extends into said second member, spring means within said first member for rotating said spacing member in a direction whereby it is moved by said threaded connection toward said second member, a third member within said second member for engaging said portion of said spacing member when it extends a predetermined distance into said second member preventing the rotation of the spacing member by said spring means, a spring interposed between said third member and said second member urging said third member into engagement with said portion of said spacing member, and abutment means for preventing engagement of the third member with said portion of said spacing member when said portion of said spacing member extends less than said predetermined distance into said second member.

References Cited in the file of this patent

UNITED STATES PATENTS

| | | |
|---|---|---|
| 951,577 | Price | Mar. 8, 1910 |
| 1,659,544 | Dodge | Feb. 14, 1928 |
| 2,205,889 | Mabrito | June 25, 1940 |
| 2,241,163 | Rouch | May 6, 1941 |
| 2,242,685 | Swift | May 20, 1941 |
| 2,255,260 | Loweke | Sept. 9, 1941 |
| 2,527,156 | Schuster | Oct. 24, 1950 |
| 2,695,078 | Brooks | Nov. 23, 1954 |